US010078687B2

(12) United States Patent
Rubin et al.

(10) Patent No.: US 10,078,687 B2
(45) Date of Patent: Sep. 18, 2018

(54) DELETION OF ELEMENTS FROM A PROBABILISTIC DATA STRUCTURE

(71) Applicant: Amazon Technologies, Inc., Seattle, WA (US)

(72) Inventors: Gregory Alan Rubin, Seattle, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 392 days.

(21) Appl. No.: 14/849,481

(22) Filed: Sep. 9, 2015

(65) Prior Publication Data

US 2017/0068727 A1    Mar. 9, 2017

(51) Int. Cl.
G06F 17/30    (2006.01)

(52) U.S. Cl.
CPC .. G06F 17/30687 (2013.01); G06F 17/30483 (2013.01); G06F 17/30631 (2013.01)

(58) Field of Classification Search
CPC ......... G06F 17/30687; G06F 17/30483; G06F 17/30631
USPC ...................................................... 707/741
See application file for complete search history.

(56) References Cited

U.S. PATENT DOCUMENTS

| 7,865,608 | B1 | 1/2011 | Schuba et al. |
| 2005/0216669 | A1 | 9/2005 | Zhu et al. |
| 2007/0078827 | A1* | 4/2007 | Sareen ............. G06F 17/30687 |
| 2008/0033942 | A1 | 2/2008 | Kao et al. |
| 2008/0225740 | A1 | 9/2008 | Martin et al. |
| 2008/0256094 | A1 | 10/2008 | Gupta et al. |
| 2010/0332471 | A1 | 12/2010 | Cypher |
| 2011/0029549 | A1 | 2/2011 | Pandya |
| 2011/0276744 | A1 | 11/2011 | Sengupta et al. |
| 2012/0084459 | A1* | 4/2012 | Wu ..................... H04L 45/7453 709/238 |
| 2012/0310960 | A1* | 12/2012 | Watanabe ......... G06F 17/30946 707/756 |
| 2012/0322413 | A1 | 12/2012 | Haddad et al. |

(Continued)

OTHER PUBLICATIONS

International Search Report and Written Opinion dated Dec. 16, 2016, International Patent Application No. PCT/US2016/051129, filed Sep. 9, 2016.

(Continued)

Primary Examiner — Evan Aspinwall
(74) Attorney, Agent, or Firm — Davis Wright Tremaine LLP

(57) ABSTRACT

A computer system receives a request to remove an entry from a probabilistic data structure. In response to the request, the computer system queries the probabilistic data structure to determine a current iteration value for the entry within the probabilistic data structure. The current iteration value indicates a state of the entry such that a first state corresponds to the entry being a member of a set and a second state corresponds to the absence of the entry from the set. As a result of the current iteration value denoting that the entry is a member of the set, the computer system increments the current iteration value to generate a new iteration value that corresponds to the absence of the entry from the set. The computer system uses the new iteration value and the entry to generate a new output value that is then added to the probabilistic data structure.

20 Claims, 10 Drawing Sheets

(56) References Cited

U.S. PATENT DOCUMENTS

| | | |
|---|---|---|
| 2013/0010950 A1 | 1/2013 | Kerschbaum |
| 2013/0166576 A1* | 6/2013 | Hudzia ............... G06F 17/3033 707/754 |
| 2013/0226972 A1* | 8/2013 | Kosuru ............... G06F 17/3033 707/802 |
| 2013/0318051 A1 | 11/2013 | Kumar et al. |
| 2014/0115182 A1 | 4/2014 | Sabaa et al. |
| 2014/0136760 A1 | 5/2014 | Sprouse et al. |
| 2014/0136762 A1 | 5/2014 | Li et al. |
| 2016/0110292 A1 | 4/2016 | Choi et al. |

OTHER PUBLICATIONS

Nielsen, "Why Bloom filters work the way they do", published Sep. 26, 2012, retrieved from http://www.michaelnielsen.org/ddi/why-bloom-filters-work-the-way-they-do/, 12 pages.

Nojima et al., "Cryptographically Secure Bloom-Filters" Transactions on Data Privacy 2 (2009) 131-139, retrieved from https://pdfs.semanticscholar.org/9cd3/62dd075cfe147abe270ec1da1056e07b3eb5.pdf.

Rothenberg et al., "The Deletable Bloom Filter—A new member of the Bloom family," published May 3, 2010, retrieved from https://arxiv.org/pdf/1005.0352.pdf, 3 pages.

Definition of "Key-value pair," published Aug. 2008, http://searchenterprisedesktop.techtarget.com/definition/key-value-pair, 4 pages.

* cited by examiner

DELETION OF ELEMENTS FROM A PROBABILISTIC DATA STRUCTURE

CROSS REFERENCE TO RELATED APPLICATIONS

This application incorporates by reference for all purposes the full disclosure of co-pending U.S. patent application Ser. No. 14/849,488, filed concurrently herewith, entitled "VERIFICATION OF DATA SET COMPONENTS USING DIGITALLY SIGNED PROBABILISTIC DATA STRUCTURES" and co-pending U.S. patent application Ser. No. 14/849,493, filed concurrently herewith, entitled "SIGNATURE VERIFICATION FOR DATA SET COMPONENTS USING PROBABILISTIC DATA STRUCTURES."

BACKGROUND

Bloom filters and other probabilistic data structures are often utilized to quickly and compactly determine whether an element is part of a set of elements or not. For instance, an administrator of a database can add database entries into a Bloom filter, which may then be used to support database queries by identifying whether a database entry is possibly within the database or is definitely not within the database. Bloom filters have the inherent advantage of being memory efficient, as entries added to Bloom filters are hashed in a manner that the resulting value merely triggers bits within the Bloom filter from zero to one. However, once an entry has been added to a Bloom filter, the entry cannot be removed, as changing Bloom filter bits from one to zero may impact other entries within the Bloom filter, sacrificing the integrity of the Bloom filter. Using counting filters with n-bit counters for each Bloom filter segment may be utilized to remove entries from the Bloom filter but also sacrifice memory efficiency, as each segment of the Bloom filter may now comprise many more bit values, increasing the size of the Bloom filter.

BRIEF DESCRIPTION OF THE DRAWINGS

Various embodiments in accordance with the present disclosure will be described with reference to the drawings, in which.

DETAILED DESCRIPTION

Figure 1:
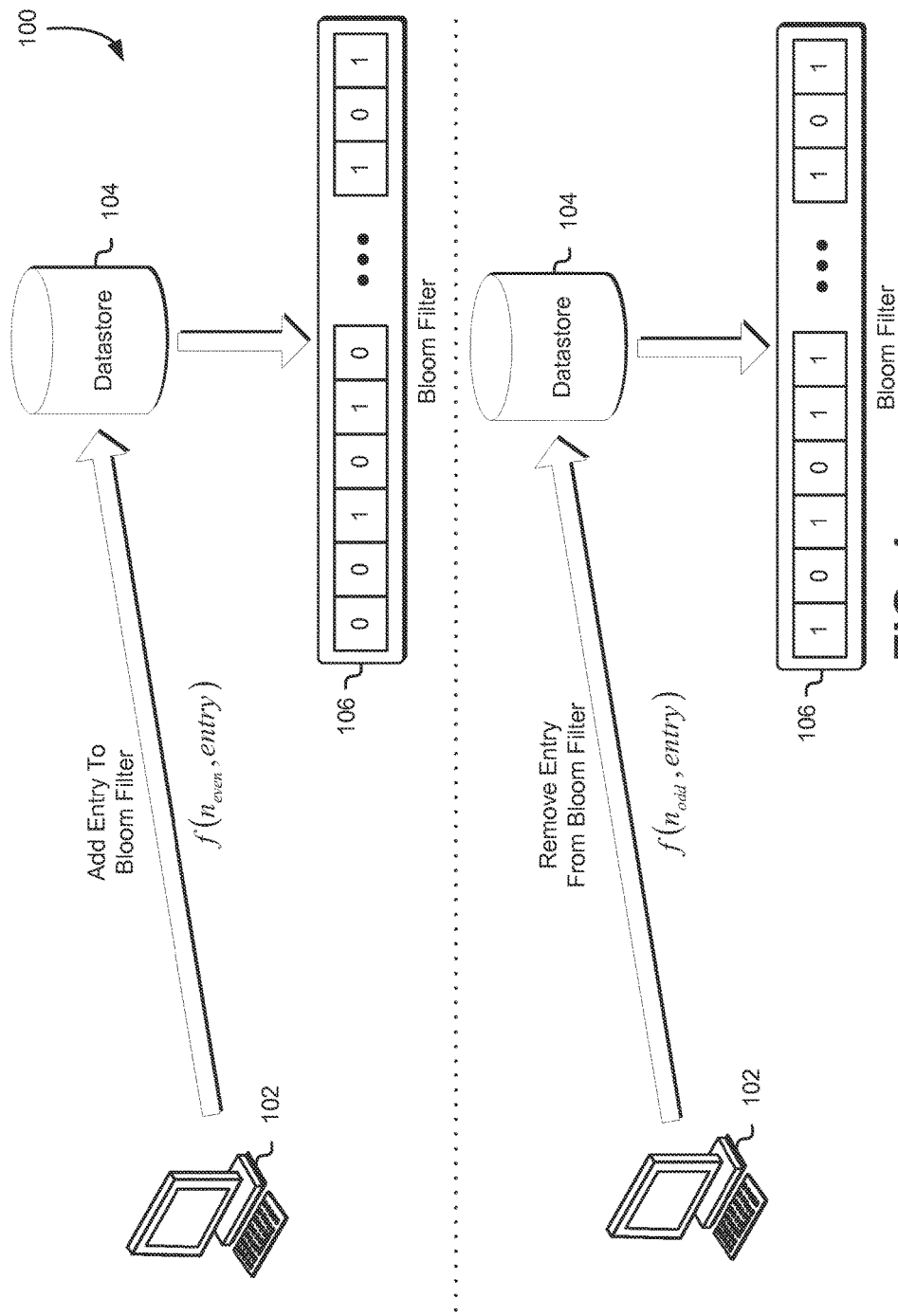
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the addition and removal of data (such as database entries) from a Bloom filter through use of functions that use, as input, the data that is either added or removed from the Bloom filter and an iteration value, which indicates whether the entry is being added or removed from the Bloom filter. In one example, when a new Bloom filter is created or at a later time, new entries may be added to a database. A database system may detect addition of these new entries to the database and update the Bloom filter to indicate that these entries are specified within the database or other grouping of entries that may support queries. To add a new entry to the Bloom filter, the database system may use the entry to be added and an initial iteration value of zero as inputs to an entry function. The output of this function may be hashed and this hash result may be used to set a number of bits within the Bloom filter from zero to one. This serves to indicate that the entry is now within the Bloom filter. Thus, when a query is submitted for the entry, the database system may determine that the entry is within the Bloom filter, as the only value for the entry within the Bloom filter may correspond to the output of the function using the entry and the highest iteration value of zero.

At a later time, to remove this entry from the database for the first time, the database system may use the entry and increment the iteration value from zero to one to provide new inputs to the entry function. The output of this function may also be hashed and used to set a number of bits within the Bloom filter to indicate the presence of the function output within the Bloom filter. However, since the iteration value has been incremented from zero to one, the presence of this function output may be utilized to indicate that the entry is no longer present within the Bloom filter. Thus, when a query is submitted to determine whether the entry is present or not within the database, the database system may determine from the Bloom filter that the highest iteration value is one, indicating that the entry is no longer present within the database. The database system may continue to utilize this function to toggle the presence of the entry within the Bloom filter by calculating hashes over an increment over the previous iteration value and the entry itself and setting the bits of the Bloom filter to indicate the presence or removal of the entry from the Bloom filter over time. For instance, if the highest iteration value is an even number, then the entry may be present within the Bloom filter. Alternatively, if the highest iteration value is an odd number, then the entry may no longer be present within the Bloom filter.

When a query is submitted to determine whether an entry is present or not within the database, the database system may query the Bloom filter for function outputs of the specified entry and the iteration values. For instance, the database system may increment the iteration values to generate various function outputs, which may be used to query the Bloom filter for presence of these outputs. If the highest iteration value is even, then the entry is present within the Bloom filter. If the highest iteration value is odd, then the entry has been removed from the Bloom filter.

In some instances, the highest iteration value in the Bloom filter may be high such that a linear search for the current iteration value may not be optimal. Under such circumstances, the database system may utilize a binary search or other more efficient algorithm to identify the highest iteration value for a particular entry and report this last iteration value in response to the user's query. This last iteration value may be used to determine whether the entry is present or absent from the Bloom filter (i.e., the Bloom filter indicates absence of the entry from a set). Further, to change the state of this entry within the Bloom filter, the a request may be submitted to the database system to increment the iteration value by one and generate a new function output, which may then be added to the Bloom filter to change the state of the entry.

In this manner, a database system may add or remove entries from a Bloom filter as a database is updated over time and determine the current state of a particular entry within the Bloom filter by identifying the highest iteration value of the entry within the Bloom filter. In addition, the techniques described and suggested herein facilitate additional technical advantages. For instance, because entries can be added or removed from the Bloom filter by incrementing the iteration value for these entries, Bloom filters may be utilized to indicate the current state of digital signatures for key-value pairs for database attributes and corresponding value. For instance, as database values and attributes change, the digital signatures associated with these database values and attributes may also change. A database system may modify the iteration values for expired and new digital signatures to update the Bloom filter to indicate the current state of the database and ensure the security of the database by providing the currently valid set of signatures for the various key-value pairs of the database.

FIG. 1 shows an illustrative example of an environment 100 in which various embodiments can be implemented. In the environment 100, a user of a datastore 104, through a user client device 102, may submit a request to store a new entry within the datastore 104. The datastore 104 may include one or more databases that may be operated and maintained by a database system, which may process user requests to store or remove data from these databases and the datastore 104 as needed. When the user submits a request to store an entry within a database in the datastore 104, the database system may evaluate a Bloom filter 106 to determine whether the entry has been added to the Bloom filter 106. For instance, the database system may utilize the entry and an iteration value of zero as inputs into an entry function to obtain an output value. For instance, the entry function may concatenate the entry and the iteration value to generate a concatenated entry that may then be added to the Bloom filter 106. The entry function may thus be a function that either definitely or with an acceptable probability, produces different values for different iteration values when the entry is held constant.

The database system may query the Bloom filter 106 to determine whether this output value is present within the Bloom filter 106. For instance, in order to determine whether the output value is present within the Bloom filter 106, the database system may pass the output value through the Bloom filter 106, which may determine whether a series of bits corresponding to the output value in the Bloom filter 106 are set to one. If so, the output value may be deemed to be present in the Bloom filter 106. However, if any of the bits corresponding to the output value are set to zero, then the output value may not be included within the Bloom filter 106 and, thus, the entry may not be within the datastore 104. If the output value is not present within the Bloom filter 106, the database system may determine that the entry has not been incorporated into the Bloom filter 106, as the entry has not been observed within the datastore 104. Thus, the database system may add this output value to the Bloom filter 106, which may cause one or more bits of the Bloom filter 106 to change from a value of zero to a value of one. This zeroth iteration value may indicate that this is the first instance of the entry being stored within the datastore 104. Further, the addition of the output value corresponding to the entry into the Bloom filter 106 may support any query for the entry from the user at a later time, should the user wish to determine the presence of the entry within the datastore 104.

At a later time, the user, through the user client device 102, may submit a request to the database system to remove an entry from one or more databases within the datastore 104. The database system may remove the entry from the one or more databases and evaluate the Bloom filter 106 to determine whether the entry is present within the Bloom filter 106. For instance, the database system may perform one or more queries of the Bloom filter 106 to determine whether the zeroth iteration value for the entry is present within the Bloom filter 106. For instance, the database system may utilize the zeroth iteration value and the entry as inputs into the entry function to produce an output value. The database system may pass this output value through the Bloom filter 106 to determine whether this output value is present within the Bloom filter 106. If so, the database system may increment the iteration value by one such that the current iteration value is one. The database system may utilize this new iteration value and the entry as input into the entry function to generate a new output value. The database system may query the Bloom filter 106 to determine whether this new output value is present within the Bloom filter 106. If so, the database system may determine that the entry has been removed from the Bloom filter 106. Otherwise, the database system may add the output value to the Bloom filter 106 to indicate that the entry has been removed from the datastore 104.

In an embodiment, as entries are added and removed from the datastore 104 over time, the database system will increment the iteration value such that an even iteration value indicates that the entry is present within the datastore 104 and an odd iteration value indicates that an entry is no longer present within the datastore 104. When a user, through its user client device 102, submits a request to store an entry within one or more databases in the datastore 104, the database system may query the Bloom filter 106 to determine the current iteration for the entry within the Bloom filter 106. If the database system determines, based at least in part on the highest iteration value in the Bloom filter, that the iteration value is an even integer, the database system may determine that the entry is currently stored within the datastore 104 and thus the iteration value need not be incremented, as the Bloom filter already indicates presence of the entry within the datastore 104. However, if the database system determines that the highest iteration value is an odd integer, the database system may determine that the Bloom filter 106 indicates that the entry has since been removed from the datastore 104. The database system may increment the highest iteration value by one and utilize this new iteration value and the entry as input into an entry function to obtain an output value that may be added to the Bloom filter 106. The Bloom filter 106 may thus be updated to indicate entry of this output value.

Similarly, when a user, through its user client device 102, submits a request to remove an entry from one or more databases of the datastore 104, the database system may determine the current iteration value for the entry by querying the Bloom filter 106 for output values of a function comprising the entry and iteration values as input. If the highest iteration value for the entry is an odd integer, the database system may determine that the Bloom filter 106 indicates that the entry has since been removed from the one or more databases of the datastore 104. Thus, the database system may not be required to update the Bloom filter 106 to indicate removal of the entry from the one or more databases of the datastore 104. However, if the highest iteration value for the entry is an even integer, the database system may increment this highest iteration value for the entry by one to obtain an odd integer. This new odd integer, as well as the entry, may be used as inputs into an entry function to generate a new output value that may be added to the Bloom filter 106. This update to the Bloom filter 106 may serve to now indicate that the entry has been removed from the one or more databases of the datastore 104 to support future entry queries.

In an embodiment, when the database system performs a query of the Bloom filter 106 to determine the current iteration value for a particular entry, the database system may utilize a binary search method to quickly determine the current iteration value. For instance, the database system may query the Bloom filter 106 to identify whether the entry has previously been added to the Bloom filter 106. The database system may submit a query for an output value based at least in part on use of the entry function with the entry and a zeroth iteration value as inputs. If the Bloom filter 106 does not include an output value corresponding to the zeroth iteration value, the database system may determine that the entry has not been observed within the datastore 104 at any previous time. If the database system determines that the output value for the zeroth iteration value is present within the Bloom filter 106, the database system may select a higher iteration value and query the Bloom filter 106 to determine whether the output value for this higher iteration value is present within the Bloom filter 106. The database system may continue to select higher iteration values until an output value corresponding to this selected value is not present within the Bloom filter 106.

If the output value corresponding to this selected iteration value is not present within the Bloom filter 106, the database system may determine whether this iteration value is a unit incremental value above the previously selected iteration value. If so, the database system may determine that the previously selected iteration value is the present iteration value for the entry within the Bloom filter 106. As noted above, if this iteration value is an even integer, the Bloom filter 106 may indicate that the entry is present within one or more databases within the datastore 104. Alternatively, if the iteration value is an odd integer, the Bloom filter 106 may indicate that the entry has since been removed from the one or more databases within the datastore 104. The database system may select a new iteration value between the previous iteration value of the found output value within the Bloom filter 106 and the current iteration value to determine whether an output value corresponding to this new iteration value is present within the Bloom filter 106. The database system may continue this process until the database system determines that the higher iteration value being queried is a unit increment higher than the last iteration value that was found within the Bloom filter 106. The database system may thus utilize this binary search method to identify the highest iteration value for an entry within the Bloom filter 106 and return this value to the user of the user client device 102 or utilize this value to determine whether this value needs to be incremented to update the status of a particular entry within the Bloom filter 106.

In an embodiment, the database system can include additional input into the Bloom filter 106 to indicate a current state of a particular attribute of a database within a datastore 104. For instance, the database system may utilize a function comprising a database attribute name and a current iteration value to generate an output value that corresponds to the current version of the particular database attribute. The database system may then add this output value to the Bloom filter 106 to indicate the current version of the database attribute in response to any queries. For this particular database attribute, the database system may utilize a second function comprising the database attribute name, the current iteration value, and the entry within this database attribute for the current iteration as input to the entry function to generate a second output value. This second output value can also be added to the Bloom filter 106 to enable database entry queries over time. Thus, as the database attribute is updated over time, the iteration value (e.g., version) of the attribute may increase, enabling the database system to query for the current value within the particular database attribute once the current iteration value is discovered.

Figure 2:
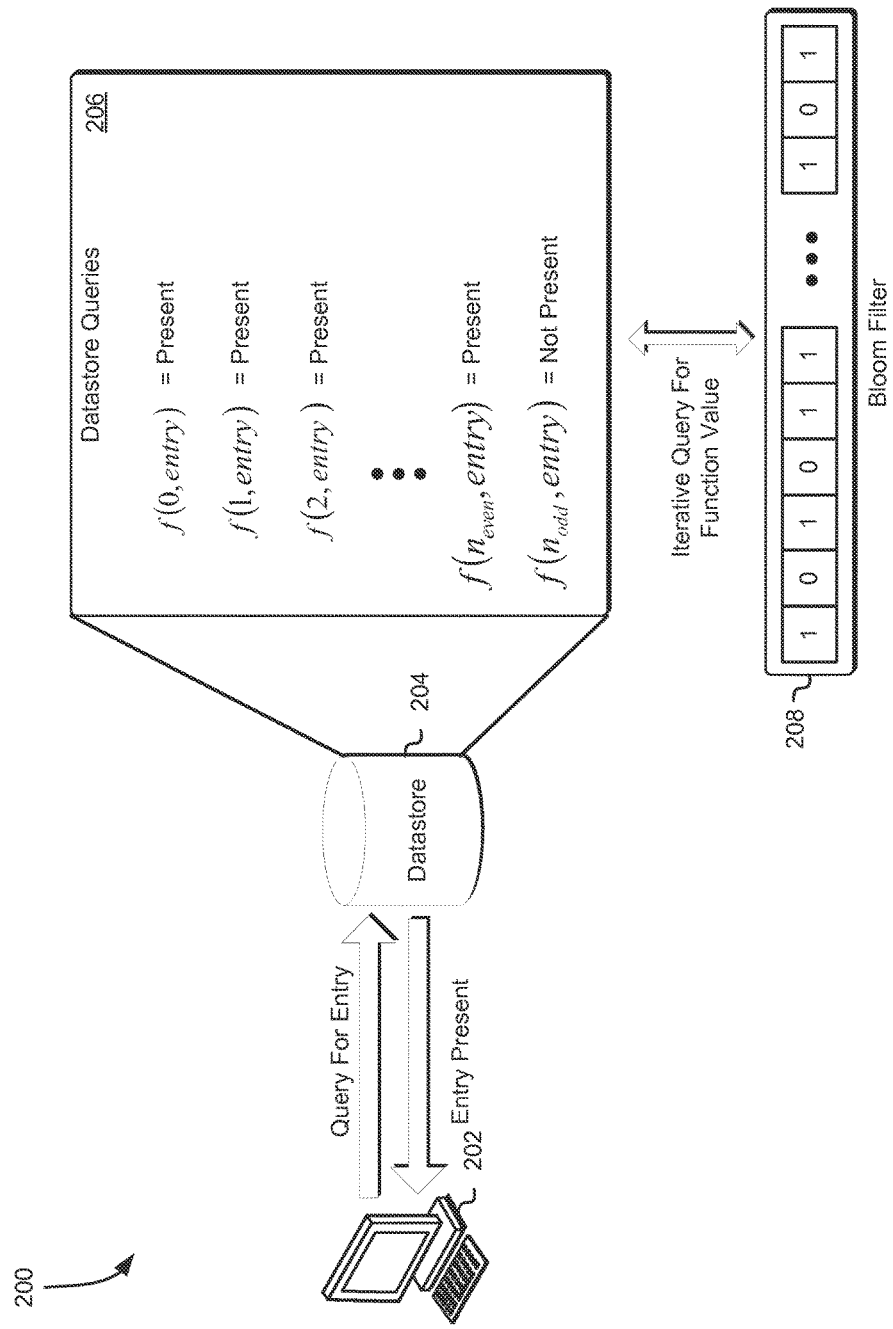
FIG. 2 shows an illustrative example of an environment in which an iterative query is performed to determine whether an entry is present within a Bloom filter in accordance with at least one embodiment.

As noted above, a database system may receive a request from a user client device to determine whether a particular database entry is present within one or more databases within a datastore. In response to the request, the database system may query a Bloom filter comprising elements corresponding to the presence, or lack thereof, of entries within the one or more databases. Based at least in part on the elements in the Bloom filter, the database system may determine whether the requested entry is present or not within the datastore. Accordingly, FIG. 2 shows an illustrative example of an environment 200 in which an iterative query 206 is performed to determine whether an entry is present within a Bloom filter 208 in accordance with at least one embodiment.

In an embodiment, a computer system can determine one or more executable instructions to be performed on hardware and/or software components of the computer system based at least in part on changes to the iteration value for an entry within the Bloom filter 106. For instance, based at least in part on the iteration value for a particular entry within the Bloom filter 106, the computer system may perform different operations. For instance, if the Bloom filter 106 enables four possible entry states, such that any iteration value may correspond to one of these four possible entry states (e.g., iteration value modulo four), the computer system may perform a different set of operations for each of these four states. As an illustrative example, an entry may correspond to a user account identifier for a particular user of the computer system. For this entry, there may be four possible states: account creation pending, account present, account deletion pending, and account deleted (e.g., non-numerical iteration values). When the computer system queries the Bloom filter 206 to determine the current iteration value for the user account identifier, the computer system may perform a modulo operation to determine the iteration value for the user account and, thus, the current status of the user account. Based at least in part on this status, the computer system may perform different operations. For instance, if the status for the user account is "account creation pending," the computer system may perform one or more operations to complete creation of the user account and then increment the iteration value to indicate that the account is present. Thus, the computer system may generate a new output value corresponding to this new iteration value and the user account and add this output value to the Bloom filter to indicate that the account is now present.

As another illustrative example, a computer system may maintain a database comprising entries corresponding to Uniform Resource Locators (URLs) of known malicious websites. Each entry may be included within the Bloom filter so long as the associated website is still categorized as being malicious. Thus, the iteration value for each URL may be used to determine whether the website associated with the URL is malicious or not. If the computer system determines, after evaluation of a particular site, that the site is no longer malicious, the computer system may query the Bloom filter 206 to determine the current iteration value for the URL of the site. Using this current iteration value, the computer system may determine whether the site is labeled as malicious within the Bloom filter 206. If so, the computer system may increment this iteration value and pass this new iteration value and the URL through an entry function to generate a new output value that may be added to the Bloom filter 206 to remove the URL from a grouping of malicious websites. Thus, if a user of the computer system submits a request to access this site using the URL, the computer system may query the Bloom filter 206 and determine that this URL no longer corresponds to a malicious website and enable the user to access the website.

It should be noted that while Bloom filters 206 are used extensively throughout the present disclosure for illustrative purposes, other probabilistic data structures may be used. A probabilistic data structure, in an embodiment, is a data structure configured such that, when maintained correctly, a query against the data structure (e.g., to determine whether an element is in a set) has a non-zero probability of being incorrect (e.g., due to a hash collision). For instance, in some embodiments, a probabilistic data structure is configured such that the probability of a false positive is below a specified threshold to balance the computational efficiency provided by the data structure with the inconvenience caused by security actions that are unnecessarily performed as a result of a false positive. Other techniques to mitigate against false positives, such as by reference to a database only when a violation is potentially detected, may be used such that additional computing resources are used to make sure there was a violation only when the potential of a violation having occurred has been detected.

In the environment 200, a user, through a user client device 202, may submit a query for a particular entry within a datastore 204 comprising one or more databases where entries may be stored. The database system, which may operate and maintain the datastore 204, may generate one or more queries 206 for a Bloom filter 208 in order to identify whether the entry is stored within the datastore 204. For instance, as illustrated in FIG. 2, the database system may utilize an entry function to obtain an output value that may be used in a query of the Bloom filter 208 to determine whether the output value is present and, if so, determine whether this is an indication of the presence of the entry within the datastore 204. The entry function may include a hash function, which may be used to generate a hash of an iteration value and the entry requested by the user through the user client device 202. The iteration value may correspond to the presence or absence of the entry in the datastore 204. For example, an iteration value that is an even integer may correspond to the presence of a particular entry within the datastore 204. Alternatively, an iteration value that is an odd integer may correspond to the absence or removal of the particular entry from the datastore 204. It should be noted that while parity values (e.g., present or not present corresponding to even and odd integer values) are used extensively throughout the present disclosure for the purpose of illustration, other values may be utilized to denote a state for the entry within the datastore 204. For instance, if the iteration value defines a plurality of states, a particular modulo value based at least in part on the iteration value and the number of possible states may correspond to the presence of the entry within the Bloom filter 206. For example, if an entry has three possible states, an iteration value that results in a modulo value equal to two may denote that the entry is present within the Bloom filter (e.g., 5 mod 3 where 5 is the iteration value, etc.). It should also be noted that the possible states may correspond to non-integer values. For instance, rather than utilizing even integer values to denote presence of the entry within the Bloom filter 206, an iteration value of "present" may denote presence while "not present" may denote that the entry is not present within the Bloom filter 206.

When a user, through the user client device 202, submits a request to store an entry within the datastore 204, the database system may perform an iterative query 206 for the entry within a Bloom filter 208 to determine whether the entry is currently present within the datastore 204 or whether the entry has either been removed from the datastore 204 or has not been previously observed within the datastore 204. For instance, the database system may utilize the entry and a zeroth iteration value as inputs into an entry function to obtain an output value. The database system may query the Bloom filter 208 for this output value to determine whether the output value is present within the Bloom filter 208. As the Bloom filter 208 is configured to indicate definitively if a value is not present within the Bloom filter 208, the database system may determine whether this zeroth iteration for the entry is present. If the function output value for the zeroth iteration is not present, then the database system may determine that the entry has not been previously observed within the datastore 204.

If the zeroth iteration for the entry is present within the Bloom filter 208, the database system may perform a linear iterative search for the function output values within the Bloom filter 208. For instance, as illustrated in FIG. 2, the database system may change the datastore query 206 by incrementing the iteration value by one (e.g., zeroth iteration is incremented to the first iteration, etc.). Thus, the database system may utilize the entry function using the incremented iteration value and the entry to generate a new output value that may be queried. The database system may query the Bloom filter 208 for this new output value and determine whether this output value is present or not within the Bloom filter 208. If the new output value is present, the database system may again increment the iteration value and perform additional queries until an output value is not found within the Bloom filter 208. When the database system determines that a particular output value is not present within the Bloom filter 208, the database system may determine that the last iteration value represents the current iteration for the particular entry within the Bloom filter 208.

In an embodiment, the database system will utilize the iteration value to determine whether the particular entry is present within the datastore 204 or has since been removed from the datastore 204. For instance, starting with the zeroth iteration value, even iteration values may denote that the particular entry is stored within the datastore 204. Alternatively, starting with the first iteration value, odd iteration values may denote that the particular entry has since been removed from the datastore 204. For instance, when a user through the user client device 202 submits a request to store an entry within the one or more databases of the datastore 204, the database system may query the Bloom filter 208 to determine the current iteration value for the entry. If the zeroth iteration value is not present within the Bloom filter 208, the database system may store the entry within the datastore 204 and add an output value to the Bloom filter 208 that corresponds to the zeroth iteration for the entry. Alternatively, if the database system determines that the current iteration value is an even integer value, then this may denote that the entry has been identified as already being stored within the datastore 204. This may cause the database system to indicate that the entry is already available and forego storing the entry within the datastore 204. Alternatively, if the iteration value is used to denote a plurality of states, the database system may utilize a modulo operation to determine the current state of the entry. Further, if the possible states for the entry are denoted using non-numerical values, the database system may determine the current state of the entry through evaluation of the current non-numerical iteration value for the entry.

If the current iteration value for the entry is an odd integer value, denoting that the entry has been previously removed from the datastore 204, the database system may store the entry within the datastore 204 to fulfill the request. Additionally, the database system may increment the iteration value such that the new iteration value is an even integer value. The database system may utilize this new even iteration value and the entry as input for the entry function and add the output value of this function to the Bloom filter 208. Thus, future queries for the entry within the Bloom filter 208 may result in discovery of the even iteration value and determination that the entry is currently stored within the datastore 204. Similarly, if the current iteration value denotes that the entry has been previously removed from the datastore 204, and the iteration value may correspond to a plurality of states greater than a parity value of states, the database system may modify the iteration value such that the new iteration value denotes presence of the entry within the datastore 204. For instance, the database system may utilize a modulo operation to identify a new iteration value that corresponds to the presence of the entry within the datastore 204 and utilize this new iteration value and the entry as input into an entry function to generate an output value that may be added to the Bloom filter 206.

In a similar manner, the user, through the user client device 202, may submit a request to remove an entry from the datastore 204. The database system may query the Bloom filter 208 to determine the current iteration value for the particular entry and, based at least in part on this iteration value, determine what actions need to be performed to indicate that the entry has been removed from the datastore 204 and from the Bloom filter 208. For instance, if the current iteration value is an odd integer value, the database system may determine that the Bloom filter 208 currently denotes that the entry has been removed from the datastore 204. Thus, the database system may remove the entry from the datastore 204 without need to update the current iteration value. However, if the current iteration value is an even integer value, the database system may increment the current iteration value by one to generate an odd iteration value. The database system may use this new odd iteration value, as well as the entry, as inputs into the entry function to generate a new output value that may be added to the Bloom filter 208 to denote the removal of the entry from the datastore 204. The database system may then fulfill the request from the user client device 202 by removing the entry from the datastore 204. Similarly, if the current iteration value denotes that the entry is stored within the datastore 204, and the iteration value may correspond to a plurality of states greater than a parity value of states, the database system may modify the iteration value such that the new iteration value denotes removal of the entry from the datastore 204. For instance, the database system may utilize a modulo operation to identify a new iteration value that corresponds to the removal of the entry from the datastore 204 and utilize this new iteration value and the entry as input into an entry function to generate an output value that may be added to the Bloom filter 206.

In an embodiment, the database system will query the Bloom filter 208 using a binary search algorithm rather than a linear iterative search for the current iteration value for a particular entry. The database system may initiate the query of the Bloom filter 208 by determining if the zeroth iteration output value is present within the Bloom filter 208. If this output value is not present within the Bloom filter 208, the database system may determine that the entry has not been previously observed within the datastore 204 and thus there is no current iteration value for the entry as there is no historical information for the entry. If the output value for the zeroth iteration is present within the Bloom filter 208, the database system may select a higher iteration value for evaluation. For instance, the database system may select a maximum possible iteration value for the entries of the datastore 204 as determined by an administrator of the database system. Alternatively, the database system may select an arbitrary iteration value that is greater than a unit incremental increase from the zeroth value (e.g., a new iteration value greater than one).

The database system may query the Bloom filter 208 for the output value corresponding to this new iteration value to determine whether the output value is present within the Bloom filter 208. If the output value for this new iteration value is present within the Bloom filter 208, the database system may select a higher iteration value and continue this process until an iteration value is identified where the output value for the iteration value is not present within the Bloom filter 208. However, if the output value for this new iteration value is not present within the Bloom filter 208, the database system may select an iteration value that is the average value between the current iteration value (e.g., the new iteration value just used) and the previous iteration value where the output value for the previous iteration value was found within the Bloom filter 208. The database system may then utilize this average iteration value to determine whether the output value for this iteration value is present within the Bloom filter 208. If the output value is not present within the Bloom filter 208, the database system may determine that the current iteration value is between this average value and the previous iteration value corresponding to the latest output value found within the Bloom filter 208.

The database system may continue to modify the iteration value for the entry until the new iteration value is a unit increment greater than the last iteration value corresponding to an output value found within the Bloom filter 208. If the output value for this new iteration value is found within the Bloom filter 208, the database system may determine that this new iteration value is the current iteration value for the entry and determine whether the iteration value corresponds to the presence of the entry within the Bloom filter 208 or to the removal of the entry from the Bloom filter 208. Similarly, if the output value corresponding to the new iteration value is not found within the Bloom filter 208, the database system may determine that the last iteration value corresponding to the output value found within the Bloom filter 208 is the current iteration value for the entry. As illustrated in FIG. 2, if the current iteration value is an even value, the entry may be present within the Bloom filter 208. Alternatively, if the current iteration value is an odd value, the entry may have been removed from the Bloom filter 208 and the datastore 204 during a previously operation.

Figure 3:
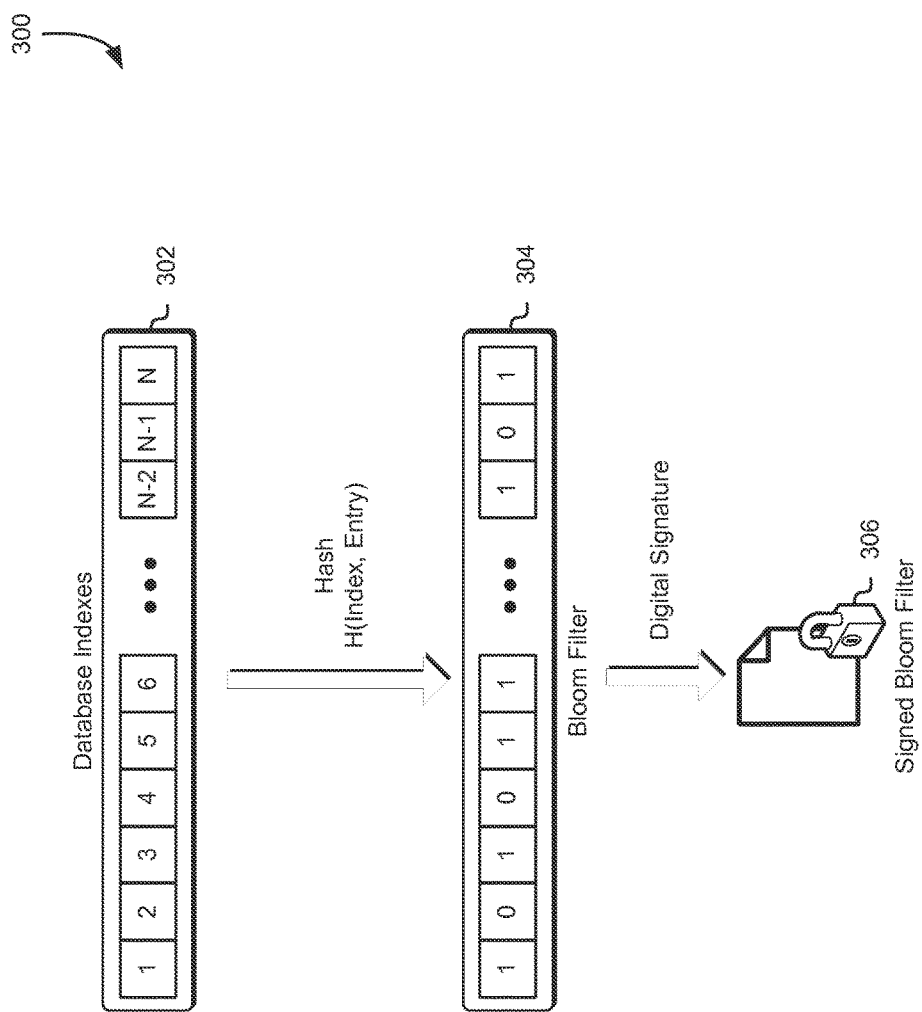
FIG. 3 shows an illustrative example of an environment in which a Bloom filter covering entries of key-value pairs of database attributes and values is digitally signed in accordance with at least one embodiment.

In an embodiment, a database system may hash key-value pairs of database attribute names from the datastore and the value for each of these database attributes and add this hashed key-value pair to a Bloom filter. The Bloom filter may then be digitally signed in order to protect the integrity of the database attributes and values, as well as the Bloom filter itself. Accordingly, FIG. 3 shows an illustrative example of an environment 300 in which a Bloom filter 304 covering entries of key-value pairs of database attributes and values is digitally signed in accordance with at least one embodiment. In the environment 300, a non-relational database 302 may include a variety of indexes corresponding to various database attributes and comprising one or more values for each of these attributes.

A database system configured to maintain and operate the non-relational database 302 may utilize an entry function, using each database attribute (e.g., index) and the corresponding value for the attribute as input into the entry function, to generate an output value that may be added to a Bloom filter 304. The entry function may include a hash function, which may hash the database attribute and the corresponding value to generate the output value that is then added to the Bloom filter 304. When the database system has completed updating the Bloom filter 304 to include the output values for the database entries and the corresponding values, the database system may digitally sign the Bloom filter 304 such that a signed Bloom filter 306 is available to users of the database system. These users may utilize a public cryptographic key of a public-private cryptographic key pair to verify the digitally signed Bloom filter 306 and to decrypt the signed Bloom filter 306 for its own use. For instance, a user of the database system may utilize the signed Bloom filter 304 to determine whether certain entries for database attributes of the database 302 are present or have been removed from the Bloom filter 304 over time.

In an embodiment, the database system generates two separate output values for the database attribute itself and for the entries within the database attributes. For instance, the database system may utilize the entry function described above to specify the current iteration for a particular database attribute within the Bloom filter 304. However, as opposed to using the iteration value to denote whether an entry is present or not present within the database, the iteration value may be used to specify the current version of the database attribute. The second output value that may be added to the Bloom filter 304 for the database attribute may correspond to the value that is stored within the database 302 for the attribute. This second output value may be generated using the attribute name, the iteration value for the attribute, and the entry within the attribute for the iteration value as input for the entry function. These two output values may be added to the Bloom filter 304 and utilized to determine the current iteration for the attribute and the entry within the attribute for this current iteration value. Thus, as an attribute is updated to include a new value, including a null set for removal of a value from the attribute, the database system may generate new output values for the attribute and the entry within the attribute for a new iteration value.

In an alternative embodiment, the database system generates an output value for the database attribute, an entry within the attribute, and an iteration value for the entry to denote whether a particular key-value pair is present within the Bloom filter 304. For instance, the iteration value for the key-value pair may denote one of a plurality of states, whereby a state may correspond to the presence of the key-value pair within the Bloom filter 304 and another state may correspond to removal of the key-value pair from the Bloom filter 304. When a new value is assigned to a particular attribute, the database system may identify the current iteration value of the previous attribute value and determine whether the current iteration value denotes presence of the key-value pair within the Bloom filter 304. If the current iteration value denotes presence of the key-value pair within the Bloom filter 304, the database system may modify the iteration value such that a new iteration value denotes removal of the key-value pair from the Bloom filter 304. The database system may utilize the attribute name, the entry within the attribute, and the new iteration value as inputs into the entry function to generate an output value that is then added to the Bloom filter 304. Additionally, the database system may use the attribute name, the new entry within the attribute, and an iteration value that denotes key-value pair presence within the Bloom filter 304 as inputs into the entry function to generate an output value that may then be added to the Bloom filter 304. Thus, when submitting a query for a particular key-value pair within the Bloom filter 304, the database system may determine whether the key-value pair is present or not within the Bloom filter 304 based at least in part on the current iteration value of the key-value pair.

When a user of the database system submits a query for a particular value within a database attribute, the database system may perform various queries of the Bloom filter 304 to respond to the user's query. For instance, the database system may first query the Bloom filter 304 to determine the current iteration value for the specified attribute. The database system may utilize a similar entry function to the one described above in connection with FIGS. 1 and 2 to generate an output value that may be utilized in the query of the Bloom filter 304. Once the database system has identified the current iteration value for the attribute, the database system may utilize this current iteration value, the attribute name and the entry as input to a second function that may be used to generate a second output value that may be used to query the Bloom filter 304. The database system may utilize this second output value to determine if the entry is specified within the database for the current iteration of the attribute. If so, the database system may return a response to the query to the user indicating the presence of the value within the attribute. If the output value is not present within the Bloom filter 304, the database system may indicate that the entry is not present for the current iteration of the attribute and/or access the database to identify the current entry for the attribute and return the value of this entry to the user in response to the request.

Figure 4:
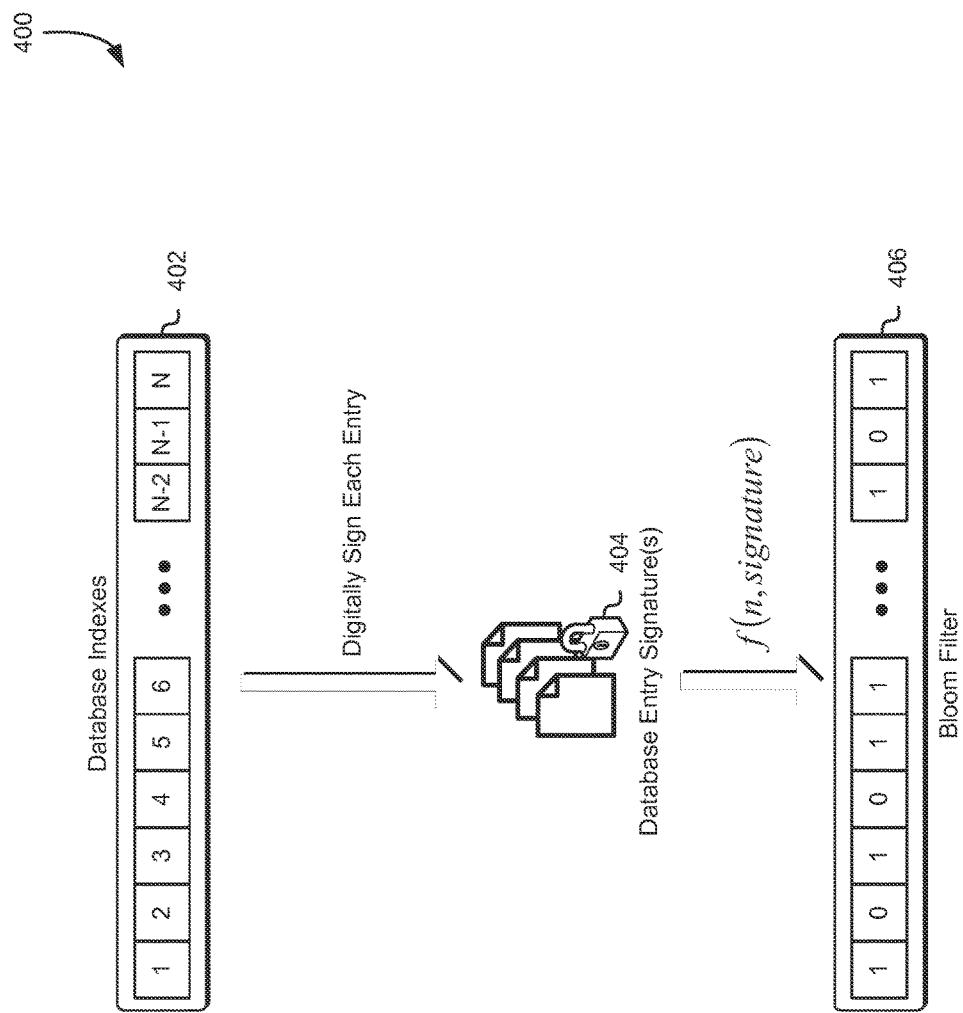
FIG. 4 shows an illustrative example of an environment in which digital signatures of key-value pairs of database attributes and values are added to a Bloom filter in accordance with at least one embodiment.

In an alternative embodiment, each key-value pair comprising the database attribute name and the corresponding entry for the attribute is digitally signed by the database system prior to inclusion within the Bloom filter. Each digital signature for the key-value pairs may be added to the Bloom filter such that current entries for certain attributes may be determined based at least in part on the current digital signature for the attribute. For instance, a user may generate a digital signature for a database attribute and a corresponding entry within the attribute and submit a query to the database system for this digital signature. Accordingly, FIG. 4 shows an illustrative example of an environment 400 in which digital signatures 404 of key-value pairs of database attributes and values are added to a Bloom filter 406 in accordance with at least one embodiment.

In the environment 400, a database system may utilize a cryptographic key to digitally sign each key-value pair of an attribute name and a corresponding value for the attribute in the database 402. The database system may utilize the Bloom filter 406 to identify a current iteration for the digital signature in a similar manner as that described above in FIGS. 1 and 2. For instance, the database system may determine, for the digital signature, the current iteration value for the digital signature, where an even iteration value may denote that the digital signature is within the Bloom filter 406 and an odd iteration value may denote that the digital signature is not within the Bloom filter 406 (e.g., value for an attribute has changed resulting in a new signature, etc.). If a digital signature has changed for a particular attribute, the database system may change the iteration value for the previous digital signature for the attribute to indicate its removal and update the Bloom filter 406 to include the newly generated digital signature 404 for the attribute.

When a user submits a query for a particular digital signature, the database system may obtain the digital signature and utilize the digital signature and an iteration value as inputs into an entry function to generate an output value. The database system may utilize this output value in a query of the Bloom filter 406 to detect presence of this output value within the Bloom filter 406. If the output value cannot be found for any iteration value, the database system may determine that the digital signature has not been previously observed and thus does not correspond to a current or previous entry within the database 402 for any attribute. Alternatively, if the output value is identified, the database system may increment the iteration value and generate new output values until an output value cannot be identified within the Bloom filter 406. The database system may identify the highest iteration value for the digital signature and determine, based at least in part on this value, whether the digital signature is currently present within the Bloom filter 406 or has since been removed from the Bloom filter 406. For instance, if the iteration value is an even integer value, then the digital signature may be present within the Bloom filter 406. Alternatively, if the iteration value is an odd integer value, the database system may determine that the digital signature is no longer within the Bloom filter 406. However, this may also indicate that the value for the attribute was, at one point, within the database 402, which may serve as some utility for the user of the database system.

Figure 5:
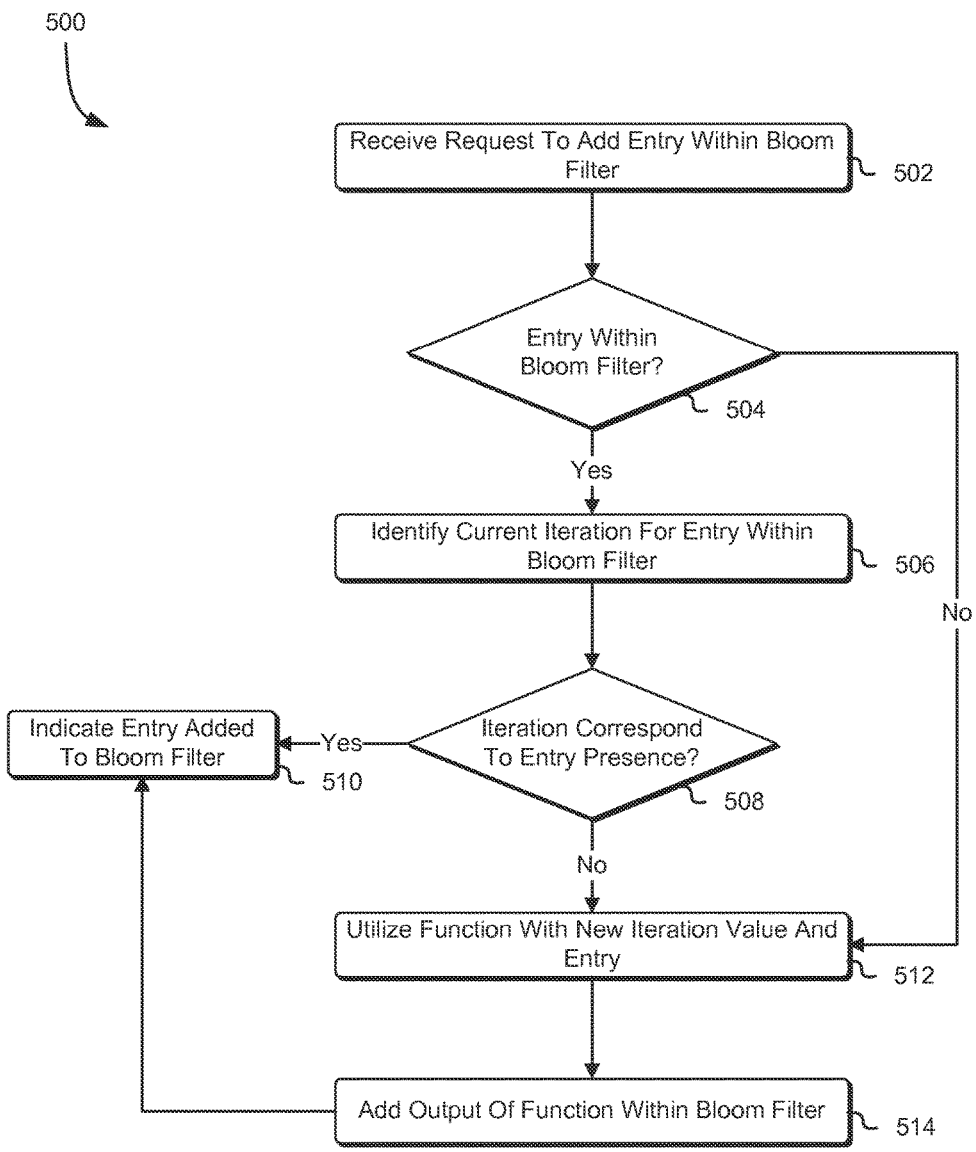
FIG. 5 shows an illustrative example of a process for adding a new entry to a Bloom filter based at least in part on a current iteration for the entry in accordance with at least one embodiment.

As noted above, a user, through a user client device, may submit a request to a database system add an entry to a database or other data structure. In order to catalog this entry, the database system may add the entry to a Bloom filter such that a query for the entry may be fulfilled through evaluation of the Bloom filter. In some embodiments, the database system will query the Bloom filter to identify a current iteration value for the entry, which may be used to determine whether the entry is specified as being within the Bloom filter or as having been removed in a Bloom filter. Based at least in part on this iteration value, the database system may either update the iteration value to indicate presence of the entry in the Bloom filter or retain the same iteration value if presence of the entry is already indicated in the Bloom filter. Accordingly, FIG. 5 shows an illustrative example of a process 500 for adding a new entry to a Bloom filter based at least in part on a current iteration for the entry in accordance with at least one embodiment. The process 500 may be performed by the aforementioned database system or other computer system configured to manage a Bloom filter for determining presence of various elements within a data structure, such as a database, spreadsheet, index, data storage device and the like.

When a user adds a new entry into a database or other data structure, the user may submit a request to a database system or other computer system to add the entry to a Bloom filter in order to enable support for queries of the entry without need to examine the database or other data structure directly. For instance, a user may submit a query to a database system for the entry, which may then utilize the Bloom filter to determine whether the entry is not within the database or may be in the database subject to a false positive error rate. Thus, the database system may receive 502 a request to add this entry to the Bloom filter.

Once the database system or other computer system has received the request to add the entry to the Bloom filter, the database system may determine 504 whether the entry has been previously added to the Bloom filter. When an entry is initially added to a Bloom filter, a database system may utilize an entry function to generate an output value corresponding to the entry that may then be added to the Bloom filter. This function may utilize an iteration value and the entry itself as inputs to generate the output value that is added to the Bloom filter. The iteration value may denote the state of the entry within the Bloom filter. For instance, the iteration value may have a parity value (e.g., even or odd integer values) to denote either the presence of the entry within the Bloom filter or the absence/removal of the entry from the Bloom filter. Alternatively, the iteration value may correspond to a plurality of states for the entry. For example, the iteration value may denote whether the entry is pending, deleted from the Bloom filter, or added to the Bloom filter. The database system may query the Bloom filter using an output value corresponding to the lowest possible iteration value (e.g., zeroth iteration value) to determine whether the entry has been previously observed within the Bloom filter. If this output value is not found within the Bloom filter, the database system may utilize 512 the aforementioned function with a new iteration value (e.g., zeroth iteration value) and the entry to generate an output value that may be added to the Bloom filter to denote addition of the entry to the Bloom filter.

If the database system identifies an element in the Bloom filter corresponding to an output value for a zeroth iteration of the entry, the database system may query the Bloom filter to identify 506 the current iteration for the entry within the Bloom filter. If the iteration value defines a parity of states, for example, an even iteration value may denote the presence of the entry within the Bloom filter while an odd iteration value may indicate that the entry has been removed from the Bloom filter. Alternatively, if the iteration value defines a plurality of states, a particular modulo value based at least in part on the iteration value and the number of possible states may correspond to the presence of the entry within the Bloom filter. For example, if an entry has three possible states, an iteration value that results in a modulo value equal to two may denote that the entry is present within the Bloom filter (e.g., 5 mod 3 where 5 is the iteration value results in a modulo value equal to two, which denotes presence, etc.).

To determine the current iteration value for the particular entry, the database system may perform a linear search query, binary search query, or other search query of the Bloom filter to identify an output value corresponding to a highest iteration value present within the Bloom filter. Once the database system has identified the current iteration value for the entry within the Bloom filter, the database system may determine 508 whether this iteration value corresponds to the presence of the entry within the Bloom filter. For instance, if the database system determines that the iteration value corresponds to the presence of the entry within the Bloom filter, the database system may indicate 510 that the entry is already present within the Bloom filter or that it has been successfully added to the Bloom filter in response to the request. However, if the current iteration value does not correspond to the presence of the entry within the Bloom filter, the database system may increment or otherwise modify the current iteration value to obtain a new iteration value that corresponds to the presence of the entry in the Bloom filter. For instance, the database system may modify the current iteration value by an amount to obtain a new iteration value that corresponds to a modulo operation solution that corresponds to the entry presence.

Once the database system has calculated the new iteration value for the entry, the database system may utilize 512 an entry function to generate an output value that may be added to the Bloom filter to indicate the presence of the entry in the Bloom filter. For instance, the database system may utilize the new iteration value and the entry as inputs to the function such that the output value from the function corresponds to the presence of the entry within the Bloom filter. The database system may add 514 this output value from the function into the Bloom filter to indicate that the entry is now present within the Bloom filter. Further, the database system may indicate 510 that the entry has been added to the Bloom filter. For instance, the database system may transmit a notification to a user client device to indicate that the addition of the entry to the Bloom filter has been completed. In some instances, the database system may not generate this notification, as the update of the Bloom filter to include this entry may be part of an internal process that does not require user involvement or interaction.

Figure 6:
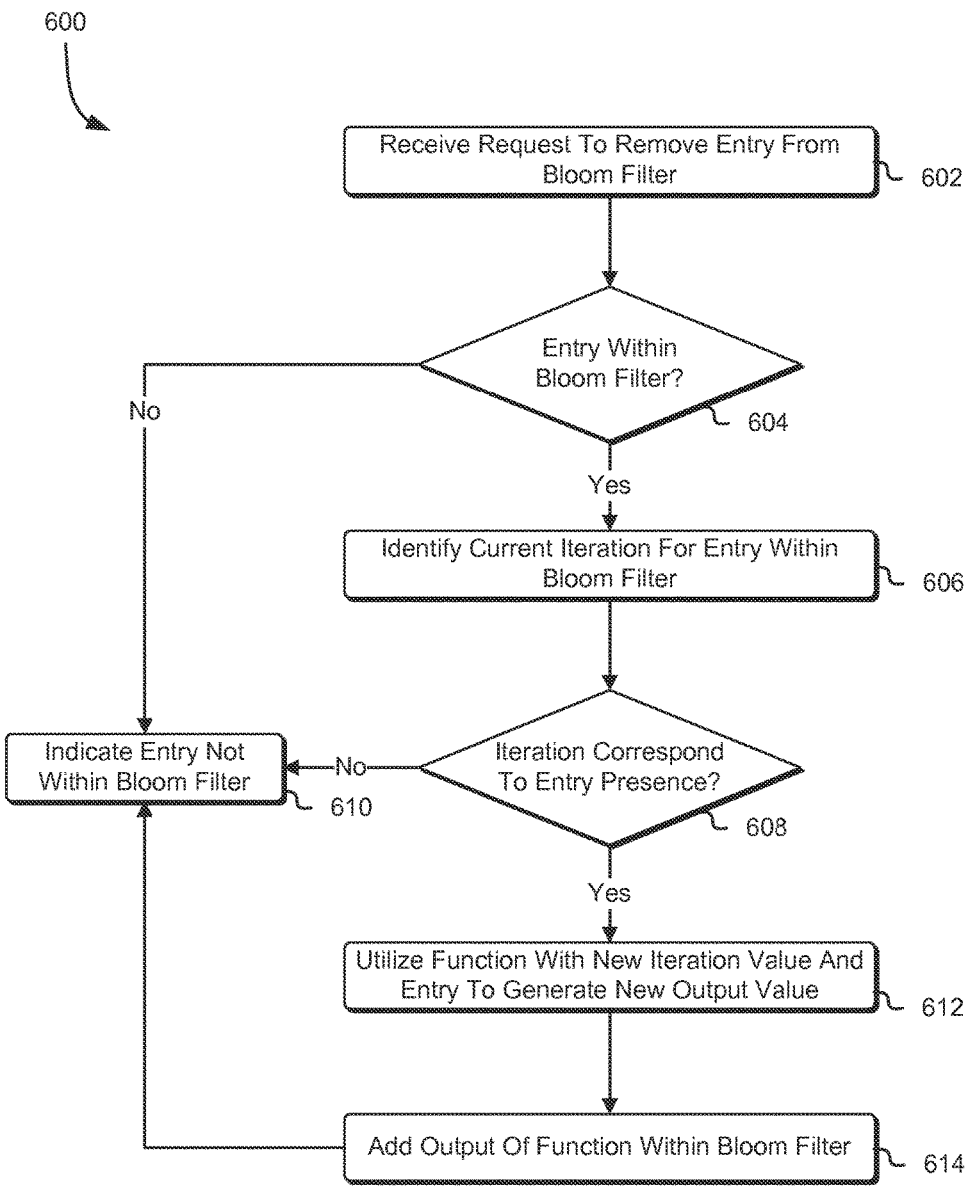
FIG. 6 shows an illustrative example of a process for removing an entry from a Bloom filter based at least in part on a current iteration for the entry in accordance with at least one embodiment.

As noted above, a user of a database system or other computer system may submit a request to remove an entry from a Bloom filter. The database system may query the Bloom filter to determine a current iteration value for the entry that is to be removed and determine whether this iteration value corresponds to the presence of the entry within the Bloom filter. Based at least in part on this iteration value, the database system may modify the iteration value to denote that the entry has been removed from the Bloom filter. Accordingly, FIG. 6 shows an illustrative example of a process 600 for removing an entry from a Bloom filter based at least in part on a current iteration for the entry in accordance with at least one embodiment. The process 600 may be performed by the aforementioned database system or other computer system configured to perform executable instructions using hardware or software installed on the computer system based at least in part on the current state of the entry within the Bloom filter.

When a user removes an entry from a database or other data structure, the user may submit a request to a database system to remove the entry from a Bloom filter in order to denote that the entry is no longer present within the database without need to examine the database or other data structure directly. For instance, a user may submit a query to a database system for the entry, which may then utilize the Bloom filter to determine whether the entry has been removed from the database or may be in the database subject to a false positive error rate. Alternatively, the user may request that a particular entry be removed from a Bloom filter that is not associated with any databases, as the Bloom filter may serve as a repository of information for various entries. Thus, the database system may receive 602 a request to remove this entry to the Bloom filter.

Once the database system has received the request to remove the entry from the Bloom filter, the database system may determine 604 whether the particular entry is present within the Bloom filter. For instance, when an entry is initially added to a Bloom filter, a database system may utilize a function to generate an output value corresponding to the entry that may then be added to the Bloom filter. This function may utilize an iteration value and the entry itself as inputs to generate the output value that is then added to the Bloom filter. The iteration value may denote the state of the entry within the Bloom filter. For instance, the iteration value may have a parity value to denote either the presence of the entry within the Bloom filter or the absence/removal of the entry from the Bloom filter. Alternatively, the iteration value may correspond to a plurality of attributes for the entry. The database system may query the Bloom filter using an output value corresponding to the lowest possible iteration value (e.g., zeroth iteration value) to determine whether the entry has been previously observed within the Bloom filter. If this output value is not found within the Bloom filter, the database system may indicate 610 that the entry is not within the Bloom filter as this particular entry may not have been previously observed.

If the database system determines that the Bloom filter includes an output value corresponding to the zeroth iteration for the entry (e.g., initial addition of the entry into the Bloom filter), the database system may identify 606 the current iteration value for the entry within the Bloom filter. For instance, the database system may perform a search query of the Bloom filter by modifying the iteration value and using this new value and the entry as inputs to an entry function to generate a new output value that may be used to query the Bloom filter. For example, if the iteration value defines a parity of states, an even iteration value may denote the presence of the entry within the Bloom filter while an odd iteration value may indicate that the entry has been removed from the Bloom filter. Alternatively, if the iteration value defines a plurality of states, a particular modulo value based at least in part on the iteration value and the number of possible states may correspond to the presence of the entry within the Bloom filter. Based at least in part on the current iteration value for the entry, the database system may determine 608 whether the entry is present within the Bloom filter.

If the current iteration value for the entry denotes that the entry is no longer present within the Bloom filter, the database system may indicate 610, to the user, that the entry is not present within the Bloom filter. Alternatively, if the iteration value for the entry denotes that the entry is present within the Bloom filter, the database system may modify the iteration value to obtain a new iteration value that may correspond to removal of the entry from the Bloom filter. Subsequently, the database system may utilize 612 the entry function described above, using the new iteration value and the entry as inputs, to generate a new output value that may be added to the Bloom filter. This output value may be utilized to indicate that the entry is no longer present within the Bloom filter. The database system may add 614 this new output value to the Bloom filter to indicate 610 that the entry is no longer within the Bloom filter, thus fulfilling the request.

Figure 7:
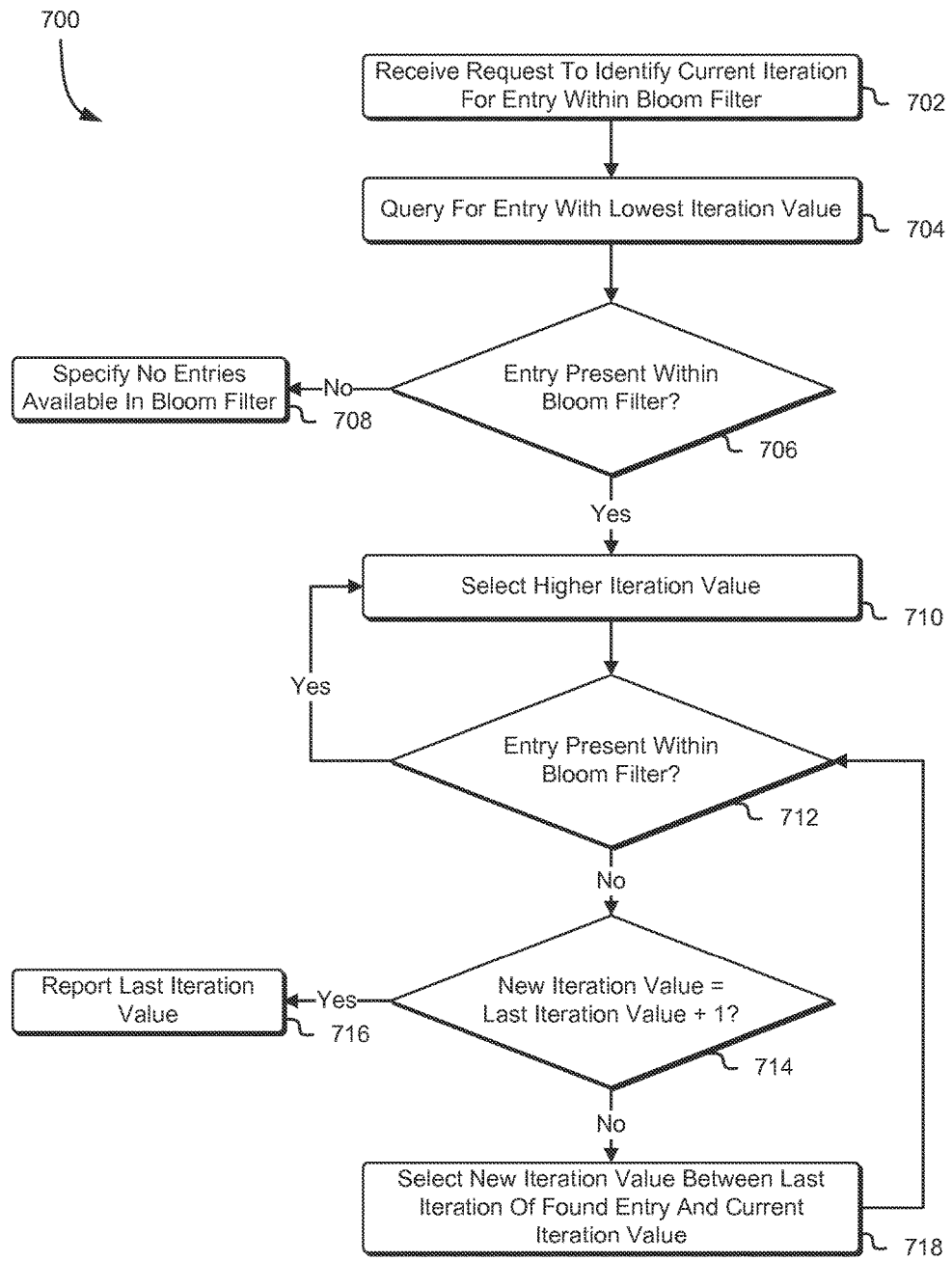
FIG. 7 shows an illustrative example of a process for performing a binary search to identify a current iteration for an entry within a Bloom filter in accordance with at least one embodiment.

As noted above, a database system or other computer system may utilize a binary search algorithm to determine a current iteration value for a particular entry within a Bloom filter. For instance, if entries within a Bloom filter are modified extensively over time, the Bloom filter may include entry elements associated with a high number of iteration values. Under such circumstances, a binary search algorithm may be utilized to identify the current iteration value for a particular entry in a manner that reduces the number of queries required. Accordingly, FIG. 7 shows an illustrative example of a process 700 for performing a binary search to identify a current iteration value for an entry within a Bloom filter in accordance with at least one embodiment. The process 700 may be performed by the aforementioned database system or other computer system that may utilize the Bloom filter to identify the current state for a particular entry within the Bloom filter in response to user queries or in the determination of operations to be performed based at least in part on the state of the entry within the Bloom filter.

At any time, the database system or other computer system may receive 702 a request to identify the current iteration value for a particular entry within the Bloom filter. For instance, a user of the database system may submit a request to the database system to determine whether a particular entry is included within the Bloom filter. This may require the database system to identify the current iteration value for the entry in order to make this determination on behalf of the user. In some instances, the database system or other computer system may perform the process 700 without requiring receipt of a request from a user or other entity as the database system or other computer system may need to identify the current state of a particular entry in order to perform one or more operations based at least in part on this current state.

To identify the current iteration value for the entry, the database system or other computer system may query 704 the Bloom filter for an output value that corresponds to a lowest iteration value (e.g., zeroth iteration value) for the entry. For instance, the database system or other computer system may input a zeroth iteration value and the entry into an entry function to generate an output value corresponding to this zeroth iteration value. The database system or other computer system may query the Bloom filter to determine 706 whether this output value is present within the Bloom filter. If this output value is not present within the Bloom filter, the database system or other computer system may specify 708 that the entry is not available within the Bloom filter, as the entry may not have been previously observed by the database system or the Bloom filter.

If the output value for the zeroth iteration value is present within the Bloom filter, the database system may select 710 a higher iteration value for the entry. The database system or other computer system may select a value that is equal to the highest observed iteration value for any entry within the Bloom filter. Alternatively, the database system or other computer system may utilize an exponential function to select the higher iteration value. For example, the database system or other computer system may begin its search with an iteration value of two. Subsequent searches may increase the iteration value to the next exponential value of two (e.g., 2, 4, 8, 16, etc.). It should be noted that any base value may be utilized to increment the iteration value to select the higher iteration value for evaluation of the Bloom filter.

The database system may utilize this higher iteration value and the entry as inputs into the entry function to generate a new output value. As with the zeroth iteration value above, the database system may query the Bloom filter to determine 712 whether this newly generated output value corresponding to the higher iteration value is present within the Bloom filter. If this output value is present within the Bloom filter, the database system may again select 710 a higher iteration value for the entry and again query the Bloom filter to determine whether the output value for this higher iteration value is present within the Bloom filter. The database system or other computer system may continue to perform these operations until an output value for a particular iteration value is determined to not be present within the Bloom filter.

If the output value corresponding to the higher iteration value for the entry is not present within the Bloom filter, the database system may determine 714 whether the difference between this higher iteration value and the previous iteration value corresponding to the last output value found within the Bloom filter is a unit increment. If the difference between these iteration values is an incremental value, the database system may determine that the previous iteration value for the entry is the current iteration value. Thus, the database system may report 716 this last iteration value to user in response to the request. Alternatively, the database system may utilize this last iteration value to determine the current state of the entry within the Bloom filter. For instance, if an even iteration value denotes the presence of the entry in the Bloom filter and an odd iteration value denotes the removal of the entry from the Bloom filter, the database system may utilize the current iteration value to determine whether the entry is either present or not present within the Bloom filter. It should be noted that while even iteration values are used to denote entry presence and odd iteration value are used to denote entry removal from the Bloom filter, any designation may be applied to even and odd iteration values, including specification that even iteration values may denote removal of the entry from the Bloom filter while odd values may denote entry presence in the Bloom filter.

If the higher iteration value is not a unit difference from the last iteration value for which the entry was present within the Bloom filter, the database system may select 718 a new iteration value that is between the last iteration value and this higher iteration value. The database system may utilize this selected iteration value and the entry to generate a new output value that may be used to query the Bloom filter for its presence. If this new output value is not present, the database system may again determine 714 whether this new iteration value is a unit increment different from the last iteration value for which the output value was found within the Bloom filter. If it is not a unit increment different from the last iteration value, the database system may continue to select 718 new iteration values until the iteration value is only a unit difference from the last iteration value for which the output value was found within the Bloom filter. The database system may then report 716 this last iteration value to the user or utilize the value to determine the current state of the entry within the Bloom filter.

Figure 8:
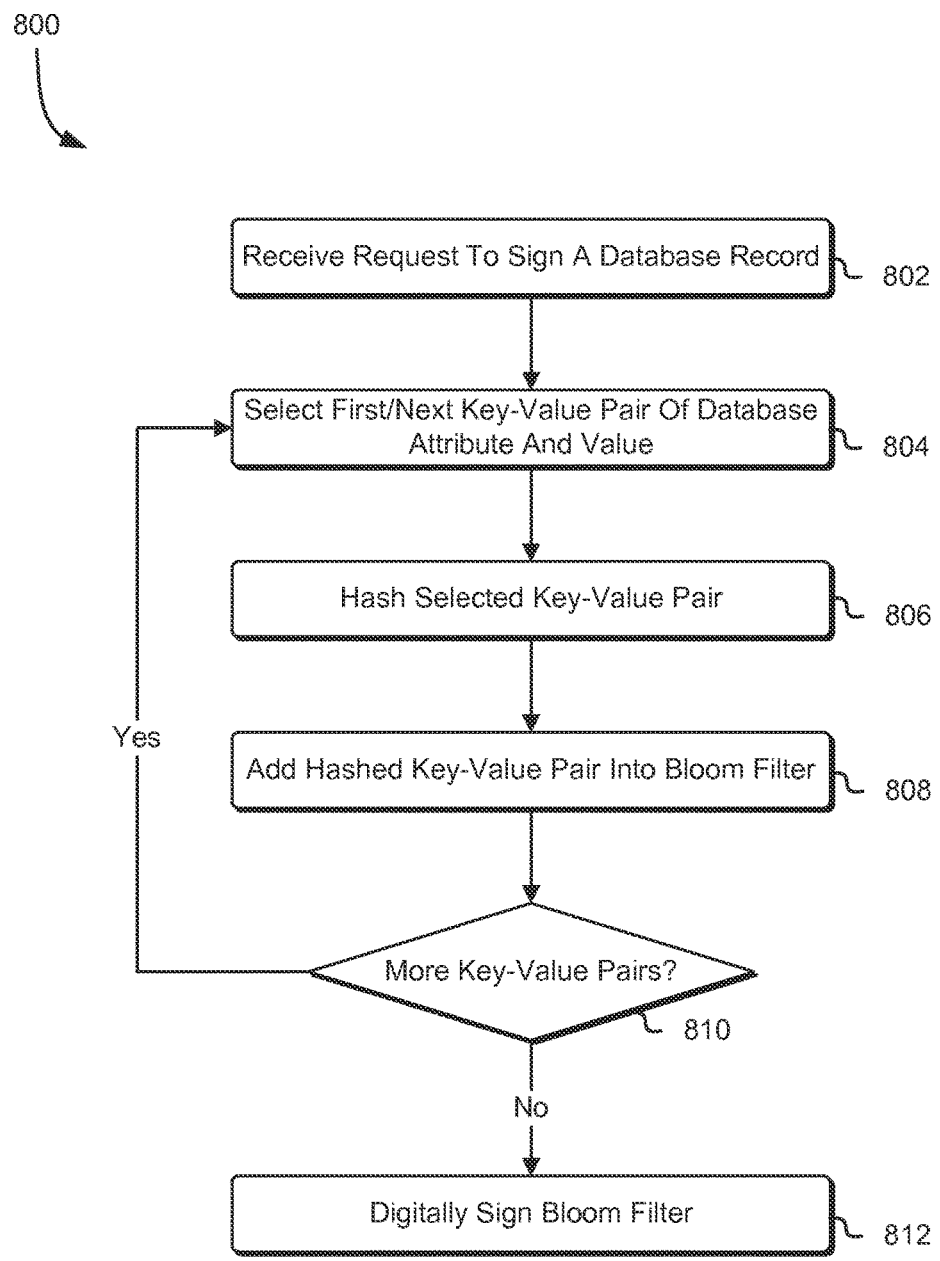
FIG. 8 shows an illustrative example of a process for adding database key-value pairs to a Bloom filter and digitally signing the Bloom filter in response to a request to sign a database record in accordance with at least one embodiment.

As noted above, a database system may add elements to a Bloom filter that may correspond to key-value pairs of database attribute names and corresponding values for these attributes. For instance, the database system may hash these key-value pairs and insert these hashes into the Bloom filter. Once the Bloom filter has been populated with these hashes, the database system may digitally sign the Bloom filter to provide a tighter binding of the digital signature to the database as a whole. Accordingly, FIG. 8 shows an illustrative example of a process 800 for adding database key-value pairs to a Bloom filter and digitally signing the Bloom filter in response to a request to sign a database record in accordance with at least one embodiment. The process 800 may be performed by the aforementioned database system, which may be configured to utilize an entry function to generate output values for the key-value pairs for database attributes and adding these output values to a Bloom filter. The database system may also be configured to utilize a private cryptographic key of a cryptographic key pair to digitally sign the Bloom filter.

At any time, a database system may receive 802 a request to digitally sign a database record. For instance, a user of the database system may want to provide an added layer of security to the database record through use of a digital signature of the database record, which may be used to verify the contents of the record at a later time. For example, when a user utilizes a public cryptographic key of a cryptographic key pair to verify the digital signature, the user may determine whether the database record is authentic or not. Thus, the digital signature may serve as a method for authentication of the database record for users of the record.

In response to the request, the database system may select 804 a first key-value pair of a database attribute and a corresponding value for the attribute from the database record. This first key-value pair may be selected at random from the database record or based at least in part on an offset within the record. For instance, the database system may select an attribute that has the lowest offset within the database record. Once the database system has selected the first key-value pair from the database record, the database system may utilize an entry function to hash or otherwise use the selected key-value pair as input to the entry function to generate an output value that may be added to the Bloom filter. In an embodiment, the database system will generate two separate output values that may correspond to the key-value pair for the attribute. For instance, a first output value may be generated based at least in part on the attribute name and an iteration value for the attribute. This iteration value may be used to denote the current iteration of the attribute. In order to enable a user or the database system to query the Bloom filter for a particular entry for the attribute, the database system may generate a second output value that is based at least in part on the attribute name, the iteration value, and the entry for the attribute at this given iteration. Thus, the database system may query the Bloom filter at a later time to first identify the current iteration value for the attribute and utilize the iteration value to fulfill queries for determining whether a particular entry is specified for the attribute at this iteration value.

Once the database system has hashed the key-value pair to generate an output value, the database system may add 808 this hash (e.g., output value from the entry function) to the Bloom filter to indicate presence of the key-value pair within the Bloom filter for the current iteration value. This may supersede any previous key-value pair entries within the Bloom filter as the output value added to the Bloom filter may correspond to a higher iteration value for the key-value pair. The database system may subsequently determine 810 whether there are additional key-value pairs for the database record that need to be added to the Bloom filter. If so, the database system may select 804 the next key-value pair from the database record and hash 806 this selected key-value pair by using the key-value pair as input into an entry function to generate the hash/output value to be added to the Bloom filter. The database system may then add 808 this hash for the selected key-value pair to the Bloom filter. This may continue until all hashes/output values for key-value pairs of the database record have been added to the Bloom filter. Once this occurs, the database system may utilize a private cryptographic key of a cryptographic key pair to digitally 812 sign the Bloom filter specifying the key-value pairs of the database record. The database system may provide this digitally signed Bloom filter to users of the database system to verify the authenticity of the database record and perform Bloom filter queries to determine the current values for various database attributes for the current iteration value.

It should be noted that while database key-value pairs are used extensively throughout the present disclosure for the purpose of illustration, other data sets may be utilized. For instance, a computer system may encode a plurality of components of a data set into the Bloom filter or other probabilistic data structure such that an entity may verify an individual component of the data set by verifying the component against the Bloom filter and verifying the digital signature of the Bloom filter. In an embodiment, the data set can comprise a plurality (e.g., a sequence) of bits of a data object such that the individual components added to the Bloom filter or other probabilistic data structure can be subsequences of the bits of the data object (e.g., by way of hashes thereof being added to the Bloom filter). In this manner, integrity of less than all of the data can be checked using the Bloom filter without having to access all of the data.

Figure 9:
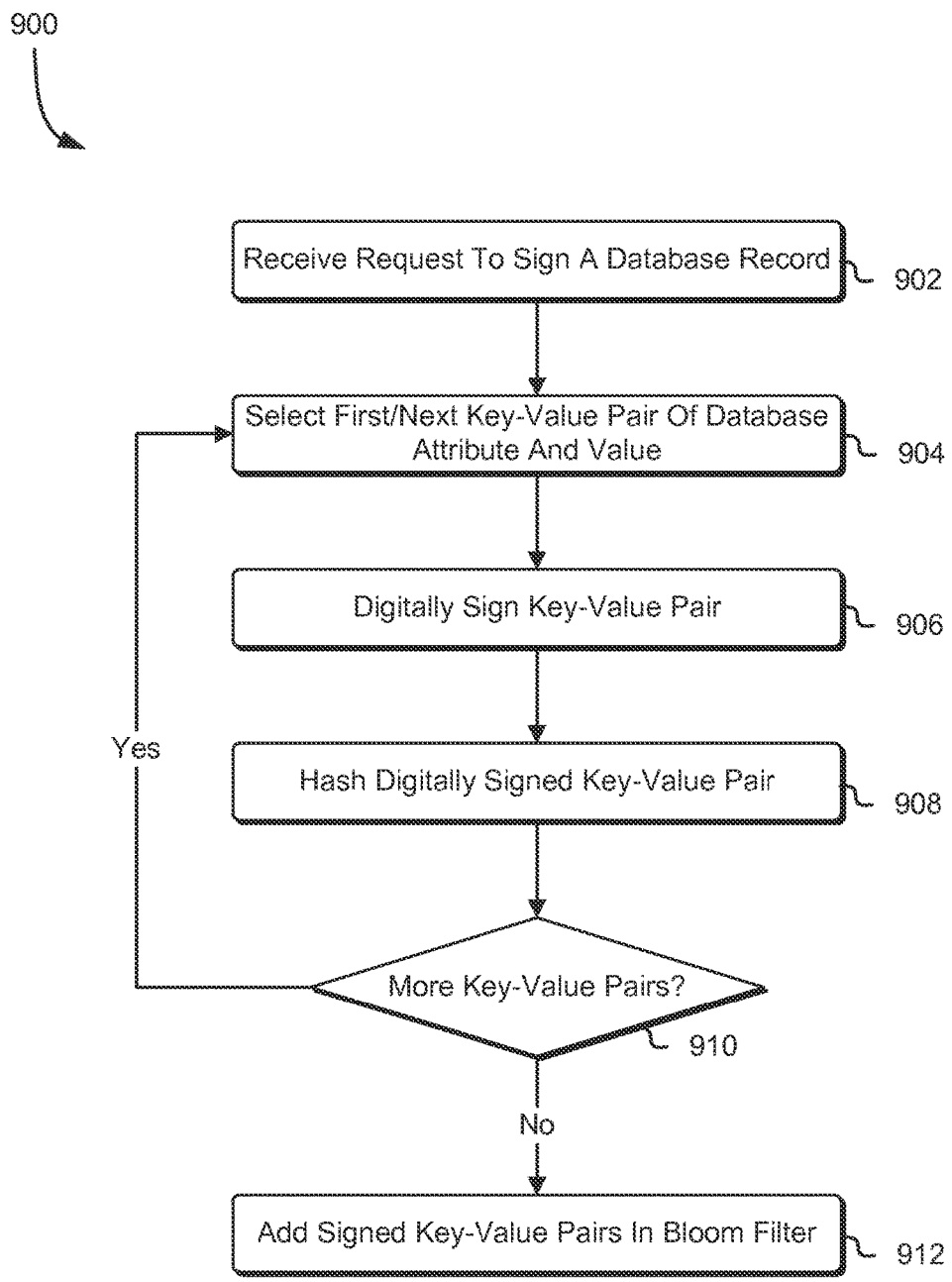
FIG. 9 shows an illustrative example of a process for adding digital signatures of database key-value pairs to a Bloom filter in response to a request to sign a database record in accordance with at least one embodiment.

As noted above, as an alternative to the process 800 described above, a database system may instead digitally sign each key-value pair and utilize these digital signatures as input into an entry function to generate a hash/output value. The database system may add these hashes/output values to the Bloom filter such that a user may query the Bloom filter to determine whether a particular digital signature is present within the Bloom filter. If so, then the particular key-value pair may be authenticated. Further, as values for attributes change, the database system may generate new digital signatures that may be added to the Bloom filter for authentication of a latest iteration of the key-value pair. Accordingly, FIG. 9 shows an illustrative example of a process 900 for adding digital signatures of database key-value pairs to a Bloom filter in response to a request to sign a database record in accordance with at least one embodiment. The process 900 may be performed by the aforementioned database system, which may be configured to digitally sign each key-value pair of a database record and hash these digital signatures for inclusion within the Bloom filter.

Similar to the process 800 described above, the database system may receive 902 a request to digitally sign a database record. This may cause the database system to select 904 a first key-value pair for a database attribute and the corresponding value for the attribute. This first key-value pair may be selected at random from the database record or based at least in part on an offset within the record. For instance, the database system may select an attribute that has the lowest offset within the database record. Once the database system has selected this first key-value pair from the database record, the database system may utilize a private cryptographic key of a cryptographic key pair to digitally sign 906 the selected key-value pair and generate a digital signature that may be added as an entry in the Bloom filter. For instance, the database system may utilize an entry function to generate 908 an output value (e.g., hash) that is based at least in part on the digitally signed key-value pair and an iteration value for the digital signature of the key-value pair.

In an embodiment, the database system will generate two separate output values that may correspond to the digital signature of the key-value pair. For instance, a first output value may be generated based at least in part on the attribute name and an iteration value for the attribute. This iteration value may be used to denote the current iteration of the attribute. In order to enable a user or the database system to query the Bloom filter for a particular digital signature for the attribute, the database system may generate a second output value that is based at least in part on the attribute name, the iteration value, and the digital signature for the attribute at this given iteration. Thus, the database system may query the Bloom filter at a later time to first identify the current iteration value for the attribute and utilize the iteration value to fulfill queries for determining whether a particular digital signature is specified for the attribute at this iteration value.

Once the database system has used the entry function to generate the output value for the digital signature that is to be added to the Bloom filter, the database system may determine 910 whether there are additional key-value pairs for which digital signatures need to be added to the Bloom filter. If so, the database system may select 904 the next key-value pair of the database record and digitally sign 906 this key-value pair. This digital signature may then be used to generate an output value that may be added to the Bloom filter. Once the database system has generated the various hashes/output values for the digital signatures of the key-value pairs, the database system may add 912 these hashes/output values to the Bloom filter to enable digital signature queries for authentication of the database record. In an embodiment, the database system can also digitally sign the Bloom filter itself to provide an addition authentication layer for the database record.

Similar to the process 800 described above, it should be noted that while database key-value pairs are used extensively throughout the present disclosure for the purpose of illustration, other data sets may be utilized. For instance, a computer system may encode digital signatures for a plurality of components of a data set into the Bloom filter or other probabilistic data structure such that an entity may verify an individual component of the data set by verifying the digital signature of the component against the Bloom filter. In an embodiment, the data set can comprise a plurality of bits of a data object such that the signatures for individual components added to the Bloom filter or other probabilistic data structure can correspond to subsequences of the bits of the data object.

Figure 10:
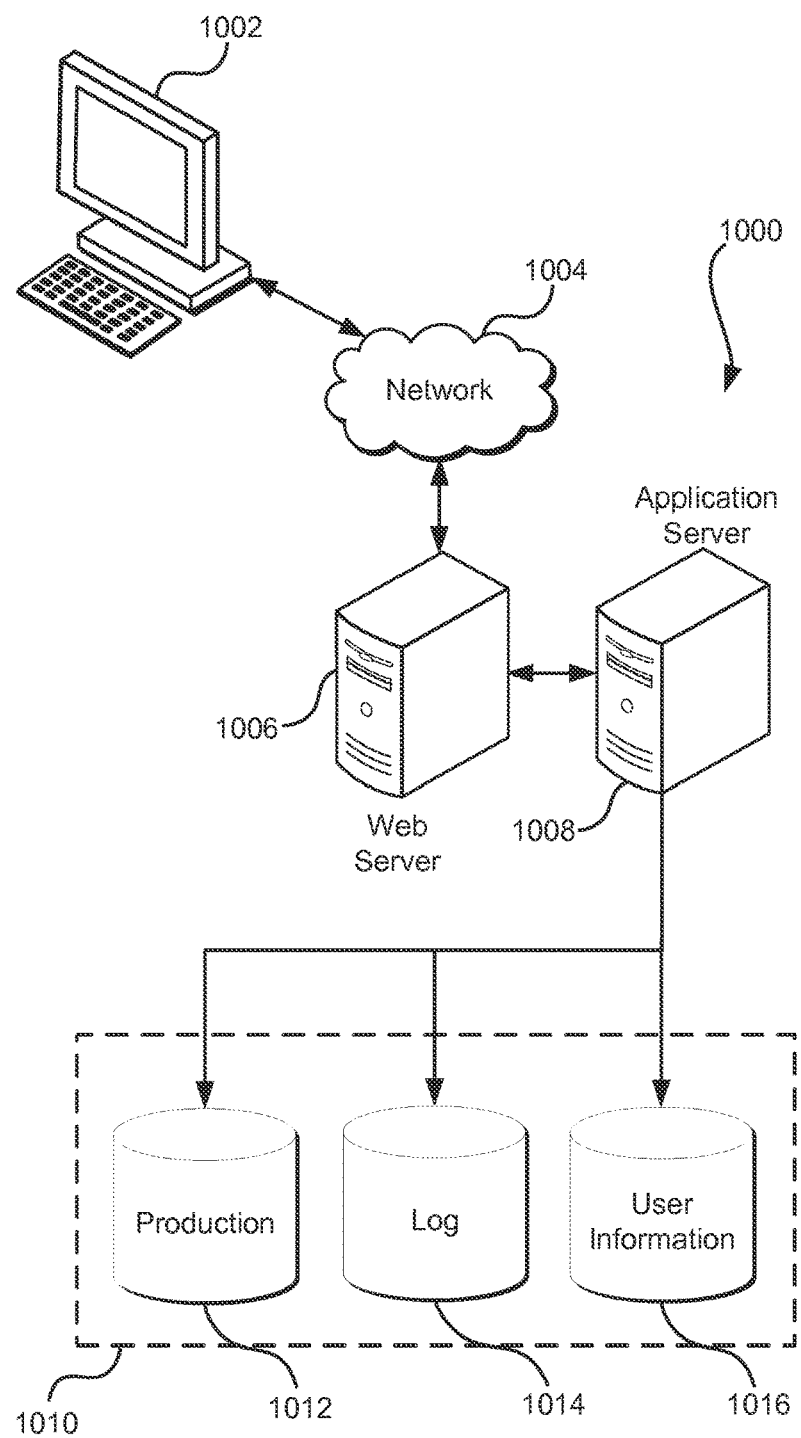
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory to store executable instructions that, if executed by the one or more processors, cause the system to:
     receive a request to remove an entry from a Bloom filter;
     query the Bloom filter to determine a current iteration value that is either from a first set of iteration values or from a second set of iteration values, the first set of iteration values indicating presence of the entry in the Bloom filter and the second set of iteration values indicating the entry having been removed from the Bloom filter; and
     respond to the second request by at least:
       if the current iteration value corresponds to the second set of iteration values, indicating that the entry is not present within the Bloom filter; and
       if the current iteration value corresponds to the first set of iteration values:
         incrementing the current iteration value to a new iteration value corresponding to the second set of iteration values;
         utilizing the new iteration value and the entry to generate an output value; and
         adding the output value to the Bloom filter to indicate removal of the entry from the Bloom filter.

2. The system of claim 1, wherein the executable instructions further cause the system to query the Bloom filter multiple times, each with a different output value corresponding to a different iteration value to determine the current iteration value as a highest iteration value for the entry.

3. The system of claim 1, wherein the first set of iteration values comprises first iteration values that each have a property of even integers and the second set of iteration values comprises second iteration values that each have a property of odd integers.

4. The system of claim 1, wherein the executable instructions further cause the system to:
   receive a second request to add the entry to the Bloom filter;
   query the Bloom filter to determine the current iteration value for the entry; and
   respond to the second request by at least:
     if the current iteration value corresponds to the first set of iteration values, indicating that the entry is present in the Bloom filter; and
     if the current iteration value corresponds to the second set of iteration values:
       incrementing the current iteration value to a second new iteration value corresponding to the first set of iteration values;
       utilizing the second new iteration value and the entry to generate a second output value; and
       adding the second output value to the Bloom filter to indicate that the entry is present in the Bloom filter.

5. A computer-implemented method, comprising:
   querying a probabilistic data structure to determine a current iteration state for an entry in the probabilistic data structure, the current iteration state indicating a state of the entry from a plurality of states that include a first state corresponding to the entry being a member of a set and a second state corresponding to absence of the entry from the set;
   as a result of the current iteration state corresponding to the entry being a member of the set, determining a new iteration state based at least in part on the current iteration state;
   utilizing the new iteration state and the entry to generate an output value; and
   adding the output value to the probabilistic data structure to indicate, in the probabilistic data structure, removal of the entry from the set.

6. The computer-implemented method of claim 5, wherein:
   the probabilistic data structure is a Bloom filter; and
   adding the output value to the Bloom filter includes changing one or more bits within the Bloom filter from zero to one to denote presence of the output value within the Bloom filter.

7. The computer-implemented method of claim 5, wherein the method further comprises:
   receiving a request to add the entry to the probabilistic data structure;
   querying the probabilistic data structure to determine the current iteration state for the entry; and
   as a result of the current iteration state corresponding to the second state:
     determining a different iteration state based at least in part on the current iteration state and corresponding to the first state;
     utilizing the different iteration state and the entry to generate a second output value; and
     adding the second output value to the probabilistic data structure to indicate, in the probabilistic data structure, addition of the entry to the set.

8. The computer-implemented method of claim 5, wherein the current iteration state has a parity attribute that is either a first parity state or a second parity state, wherein the first parity state corresponds to the first state and the second parity state corresponds to the second state.

9. The computer-implemented method of claim 8, wherein the first parity state is a property of odd integers and the second parity state is a property of even integers.

10. The computer-implemented method of claim 5, wherein the output value is generated by inputting at least the new iteration state and the entry into a hash function.

11. The computer-implemented method of claim 5, wherein querying the probabilistic data structure to determine the current iteration value includes:
    querying the probabilistic data structure multiple times, each with a different output value corresponding to a different iteration state and the entry; and determining the current iteration state as the highest iteration state for which the entry was added to the set.

12. The computer-implemented method of claim 5, wherein removal of the entry from the set is performed in response to a request generated as a result of removal of the entry from a database associated with the probabilistic data structure.

13. A non-transitory computer-readable storage medium having stored thereon executable instructions that, if executed by one or more processors of a computer system, cause the computer system to at least:
 determine a current iteration value for an entry in a probabilistic data structure, the current iteration value indicating a state of the entry from a plurality of states that include a first state and a second state, the current iteration value indicating a number of times the entry was used to update the probabilistic data structure, wherein at least one possible value of the current iteration value indicates whether the entry has been removed from a set;
 determine the state of the entry based at least in part on the current iteration value; and
 provide information indicating the state.

14. The non-transitory computer-readable storage medium of claim 13, wherein the instructions further cause the computer system to query the probabilistic data structure multiple times, each with a different output value corresponding to a different iteration value and the entry to determine the current iteration value.

15. The non-transitory computer-readable storage medium of claim 13, wherein the first state corresponds to membership of the entry in the set and the second state corresponds to absence of the entry in the set.

16. The non-transitory computer-readable storage medium of claim 13, wherein the probabilistic data structure is a Bloom filter comprising one or more bits used to denote presence of output values within the Bloom filter, where each output value of the output values corresponds to the entry and an iteration value.

17. The non-transitory computer-readable storage medium of claim 13, wherein the instructions further cause the computer system to:
 receive a request to add the entry to the probabilistic data structure;
 query the probabilistic data structure to determine the current iteration value for the entry; and
 fulfill the request by at least:
  if the current iteration value corresponds to the first state, indicating that the entry is a member of the set; and
  if the current iteration value corresponds to the second state:
   incrementing the current iteration value to be a new current iteration value corresponding to the first state;
   utilizing the new current iteration value and the entry to generate an output value; and
   adding the output value to the probabilistic data structure to indicate, in the probabilistic data structure, addition of the entry to the set.

18. The non-transitory computer-readable storage medium of claim 13, wherein the instructions further cause the computer system to:
 receive a request to remove the entry from the probabilistic data structure, the request generated in response to detection of removal of the entry from a database associated with the probabilistic data structure;
 query the probabilistic data structure to determine the current iteration value for the entry; and
 fulfill the request by at least:
  if the current iteration value corresponds to the second state, indicating that the entry is not present in the set; and
  if the current iteration value corresponds to the first state:
   incrementing the current iteration value to be a new current iteration value corresponding to the second state;
   utilizing the new current iteration value and the entry to generate an output value; and
   adding the output value to the probabilistic data structure to indicate, in the probabilistic data structure, removal of the entry from the set.

19. The non-transitory computer-readable storage medium of claim 13, wherein the current iteration value has a parity attribute that is either a first parity value or a second parity value, wherein the first parity value corresponds to the first state and the second parity value corresponds to the second state.

20. The non-transitory computer-readable storage medium of claim 13, wherein the instructions further cause the computer system to:
 as a result of the current iteration value corresponding to the entry being present in the probabilistic data structure, select a new iteration value corresponding to the entry being absent from the probabilistic data structure;
 generate, using the new iteration value and the entry as input to a function, a second output value; and
 add the second output value to the probabilistic data structure.

* * * * *